United States Patent
Slaby

(10) Patent No.: US 6,587,124 B1
(45) Date of Patent: Jul. 1, 2003

(54) APPARATUS AND METHOD FOR GENERATING CONFIGURATION DATA FOR A DEVICE TO ACCESS A SERVICE

(75) Inventor: John Slaby, Ascot (GB)

(73) Assignee: Virtual Access Ireland Ltd., Dublin (IE)

( * ) Notice: Subject to any disclaimer, the term of this patent is extended or adjusted under 35 U.S.C. 154(b) by 0 days.

(21) Appl. No.: 09/274,056

(22) Filed: Mar. 22, 1999

(51) Int. Cl.[7] .............................................. G06F 15/00
(52) U.S. Cl. ...................................... 345/735; 345/780
(58) Field of Search ................................ 345/735, 736, 345/747, 744, 749, 762, 743, 742, 741, 737, 738–740, 780, 777, 765, 806–807; 707/10; 709/203, 300

(56) References Cited

U.S. PATENT DOCUMENTS

| | | | | |
|---|---|---|---|---|
| 5,394,522 A | * | 2/1995 | Sanchez-Frank et al. | ... 345/744 |
| 5,452,915 A | * | 9/1995 | Hotka | ......................... 345/735 |
| 5,590,266 A | * | 12/1996 | Carson et al. | ............... 345/736 |
| 5,805,118 A | * | 9/1998 | Mishra et al. | .................. 345/1 |
| 6,112,015 A | * | 8/2000 | Planas et al. | ................ 709/200 |
| 6,269,369 B1 | * | 7/2001 | Robertson | ..................... 707/10 |

* cited by examiner

*Primary Examiner*—Steven Sax
(74) *Attorney, Agent, or Firm*—Schwegman, Lundberg, Woessner & Kluth, P.A.

(57) ABSTRACT

A system for generating sets of configuration data comprises an administrator interface allowing an administrator to enter configuration parameters for a generalized configuration and to define user specific configuration parameters necessary for the generation of a complete set of configuration data. The entered configuration parameters are stored together with information identifying the user's specific configuration parameters. A user interface is provided allowing the user to enter the user specific configuration parameters. A configuration generator generates a set of configuration data using the stored configuration parameters and the users specific configuration parameters.

12 Claims, 7 Drawing Sheets

Figure 1:
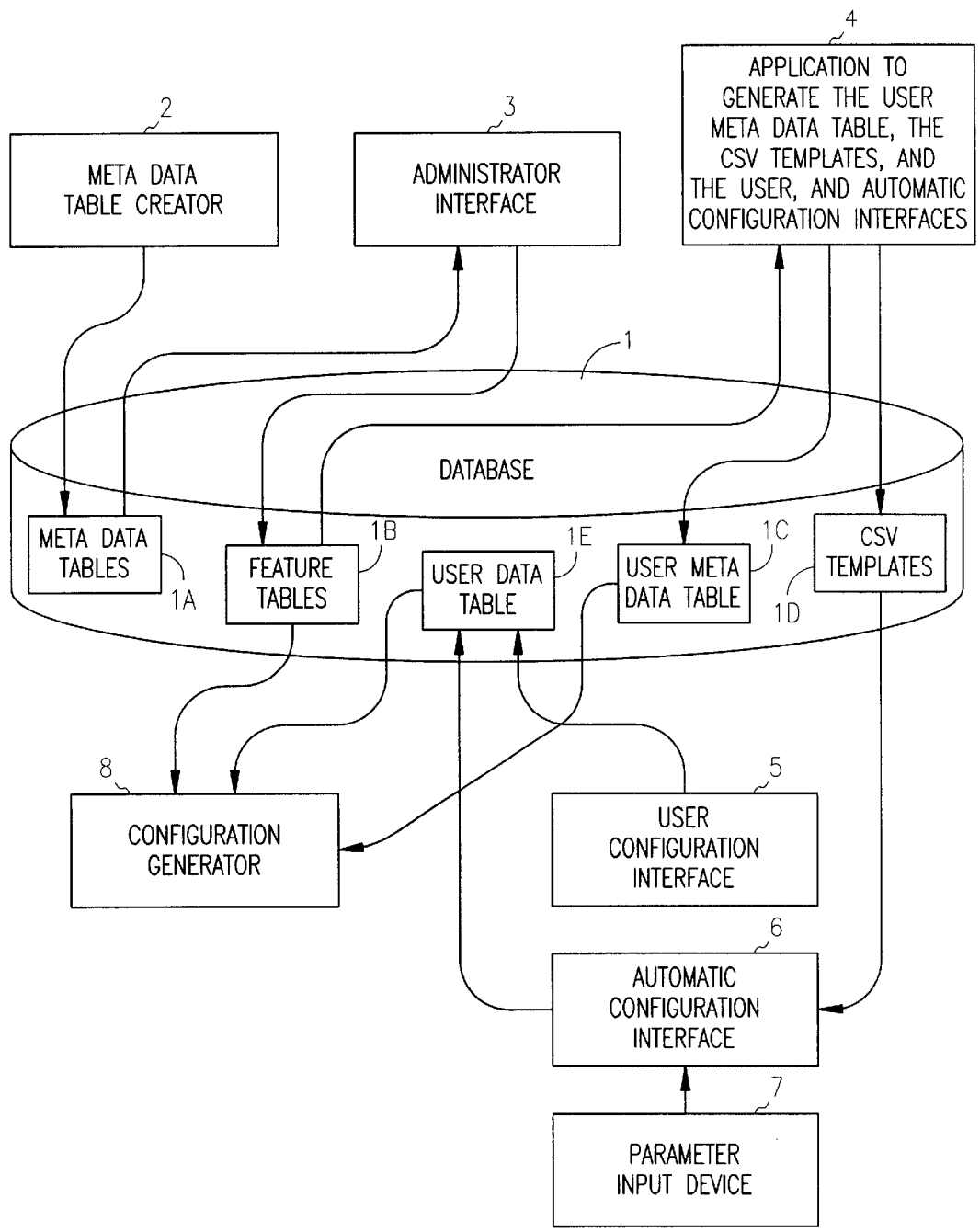

APPARATUS AND METHOD FOR GENERATING CONFIGURATION DATA FOR A DEVICE TO ACCESS A SERVICE

FIELD OF THE INVENTION

The present invention generally relates to a method and apparatus for generating configuration data for a device to access a service. The present invention particularly relates to the generation of configuration data where there is a need to generate many similar configurations for devices having some common configuration parameters to access a service.

BACKGROUND

Providers of services or equipent often have the need to generate configuration parameters for computer equipment which are required to access the services. An example of this is in the field of Internet service provision where Internet service providers often have to provide specific configuration software to configure communication devices such as modems, ISDN terminal adapters, and LAN routers in order to allow users to access the services provided by the Internet Service Provider (ISP). Conventionally this has been achieved by either specifying the entire configuration for each device individually or by providing a configuration program wherein generic configuration parameters are encapsulated within the program code and user-specific configuration parameters are entered by the user of the device. This arrangement is however inflexible. It does not allow a service provider to modify the generic parameters since they are contained within the code. Also, it does not allow the types of user-specific parameters to be varied without rewriting the program. Further, when configuration data is generated for a device, the complete set of configuration data is stored for that device even though much of it is generic. This causes a significant increase in storage space required for they centralised storing of configuration data for a number of devices. Also, this does not allow a service provider to easily modify configuration parameters which are generic to a number of devices. Such a modification conventionally requires the regeneration individually of all said configuration data for all devices affected by the change. This is an administrative burden as well as being time consuming.

SUMMARY OF THE INVENTION

It is an object of the present invention to overcome the limitations in the prior art and provide a method and apparatus which gives flexibility to an administrator to enter, modify or delete generic configuration data and to define user-specific configuration parameters.

The first aspect of the present invention achieves the above objects by providing an administrator interface which allows an administrator to enter configuration parameters for a generalised or generic configuration and to define user-specific configuration parameters necessary for the generation of a complete set of configuration data. The entered configuration parameters are stored in a storage device together with information identifying the user-specific configuration parameters required in order to complete a set of configuration data for a device. A user interface allows a user to enter the user-specific configuration parameters. A configuration generator generates a set of configuration data using said stored configuration parameters and said user-specific configuration parameters.

Thus, this aspect of the present invention achieves the object by allowing an administrator to define the generic configuration parameters and the user-specific configuration parameters. The generic configuration parameters can thus be stored and combined with the user-specific configuration parameters when input in order to generate a complete set of configuration data. The administrator thus has control over which parameters a user can enter or change.

It is an object of a second aspect of the present invention to provide an apparatus and method for generating configuration parameters which allows for the separation of generic configuration parameters and user-specific configuration parameters.

This object of the present invention is achieved by an apparatus and method in which generic configuration parameters which are common to a plurality of possible specific configurations are input and stored. Specific configuration parameters which are specific to a device configuration are input and stored separately to the generic configuration parameters. A set of configuration parameters for device configuration thus comprises the generic configuration parameters and a group of specific configuration parameters.

This aspect of the present invention enables the convenient updating of configuration parameters for a group of devices by simply updating the generic configuration parameters. Thus only one set of configuration parameters need be updated which causes the updating of the configuration parameters for a number of device configurations.

It is an object of a further aspect of the present invention, to organise the storage and display of configuration parameters to enable an operator to more easily understand and input configuration parameters.

This object of the present invention is achieved by an apparatus and method for generating configuration data for a device to access a service. A database contains: (I) a set of feature meta data comprising attributes for a plurality of features, wherein a feature comprises a user definable characteristic for at least one of the device and the service and is defined by a group of configuration parameters, and (II) a plurality of sets of said configuration parameters, each set corresponding to a feature. An interface including a display is configured in dependence upon said set of feature meta data to display prompts for the input of said configuration parameters to said database. The prompts are grouped for each feature in accordance with said sets of configuration parameters in said database.

In an embodiment, the interface is not only configured in dependence upon said set of feature meta data to display said prompts, but also to validate the parameters input by the user in accordance with the meta data.

BRIEF DESCRIPTION OP THE DRAWINGS

Figure 2:
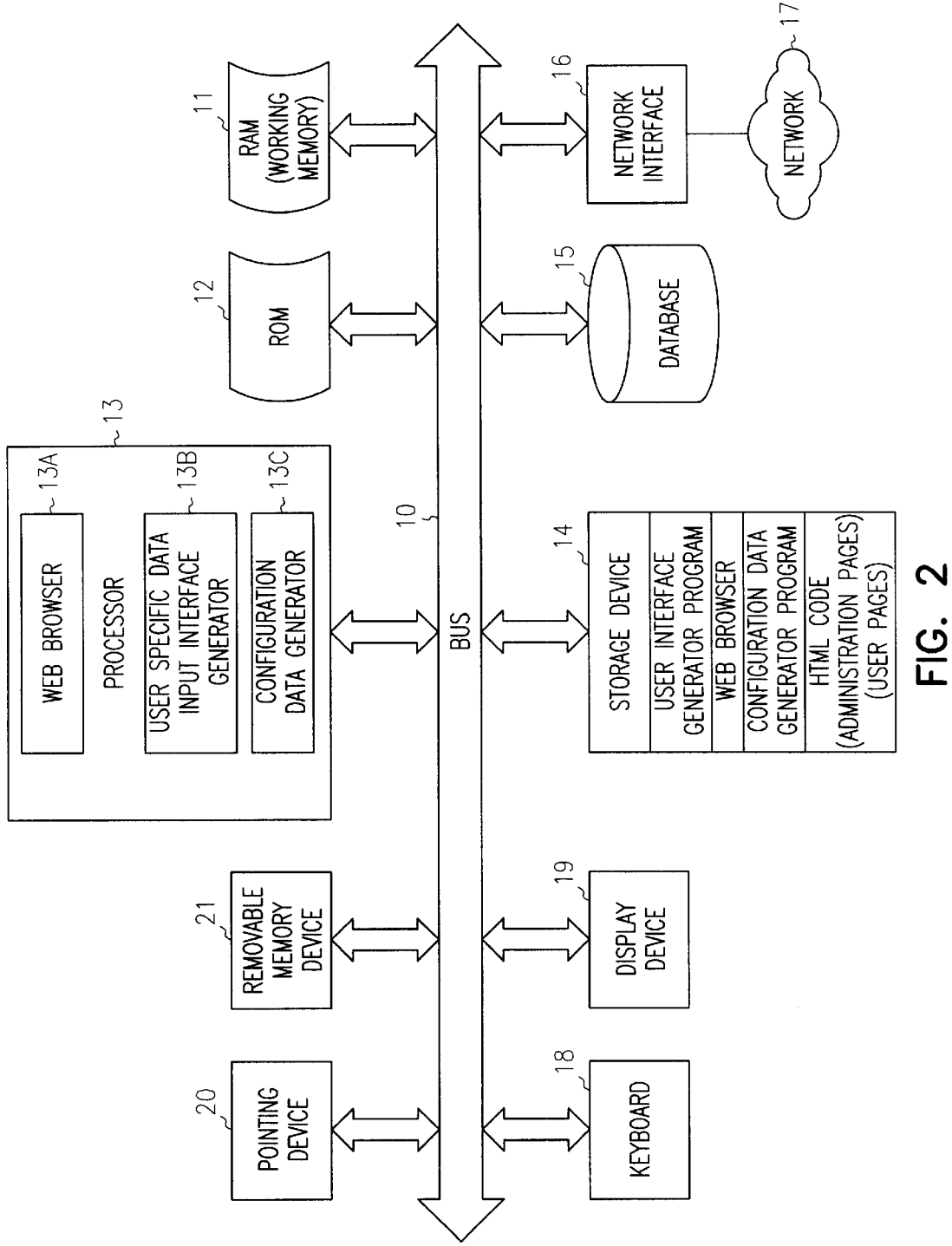
Figure 3:
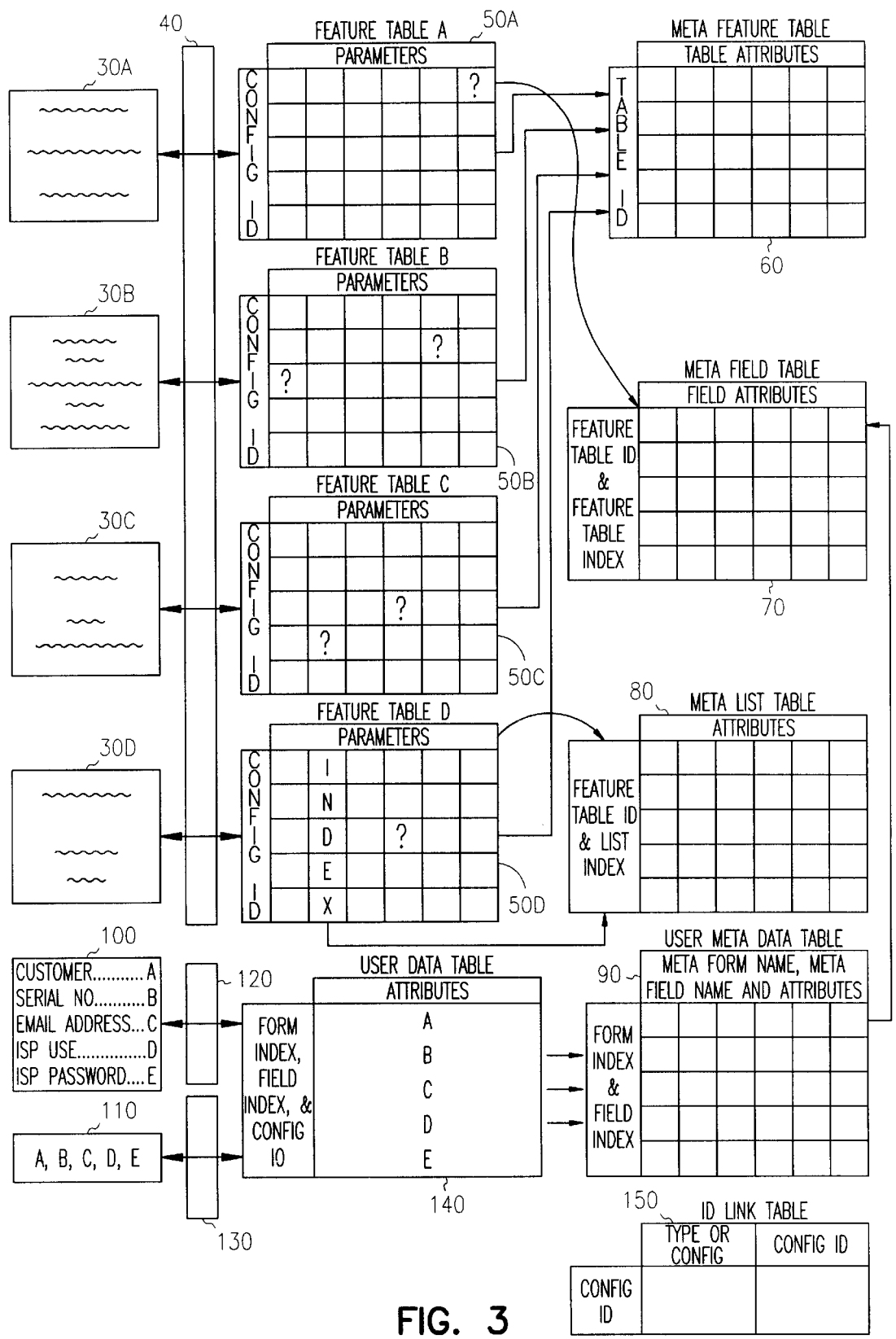
Figure 4:
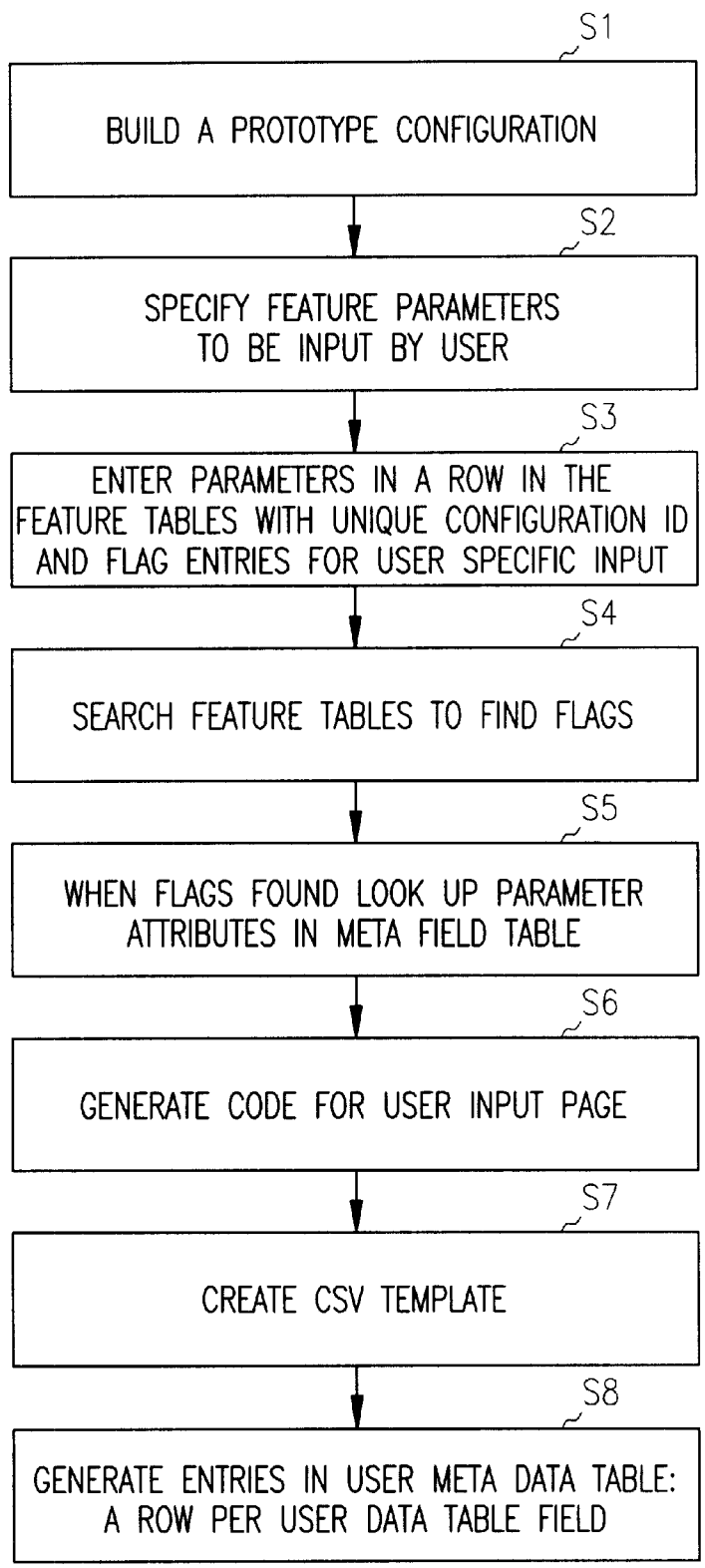
Figure 5A:
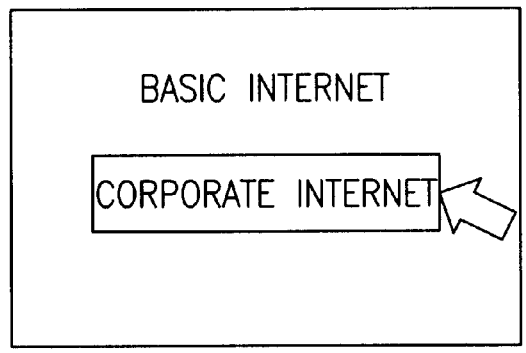
Figure 5B:
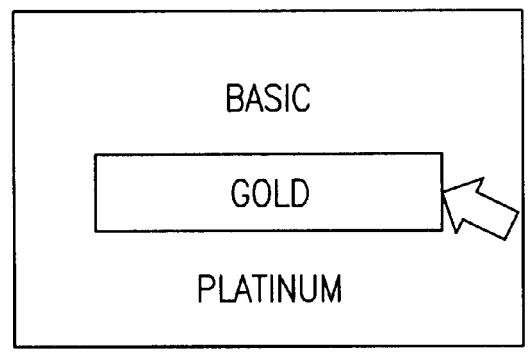
Figure 5C:
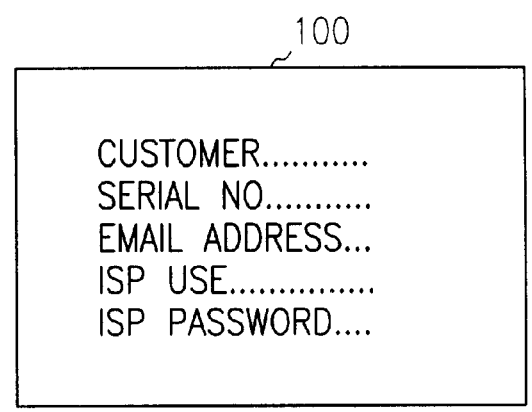
Figure 6:
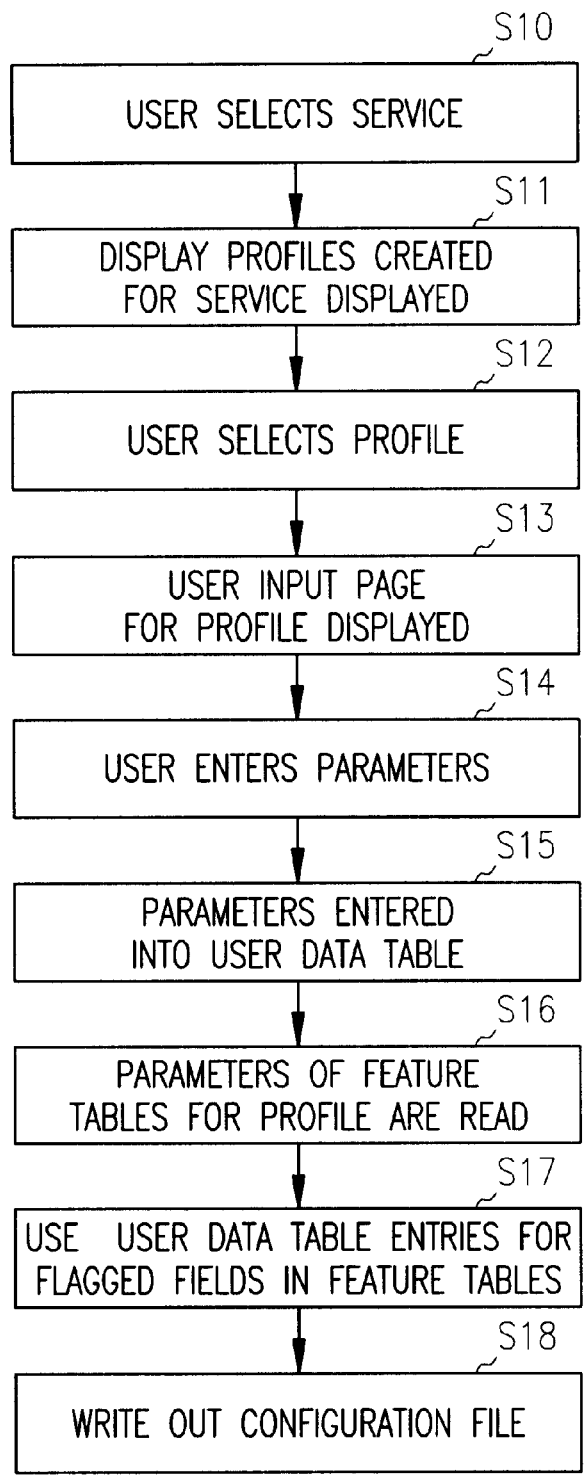
Figure 7:
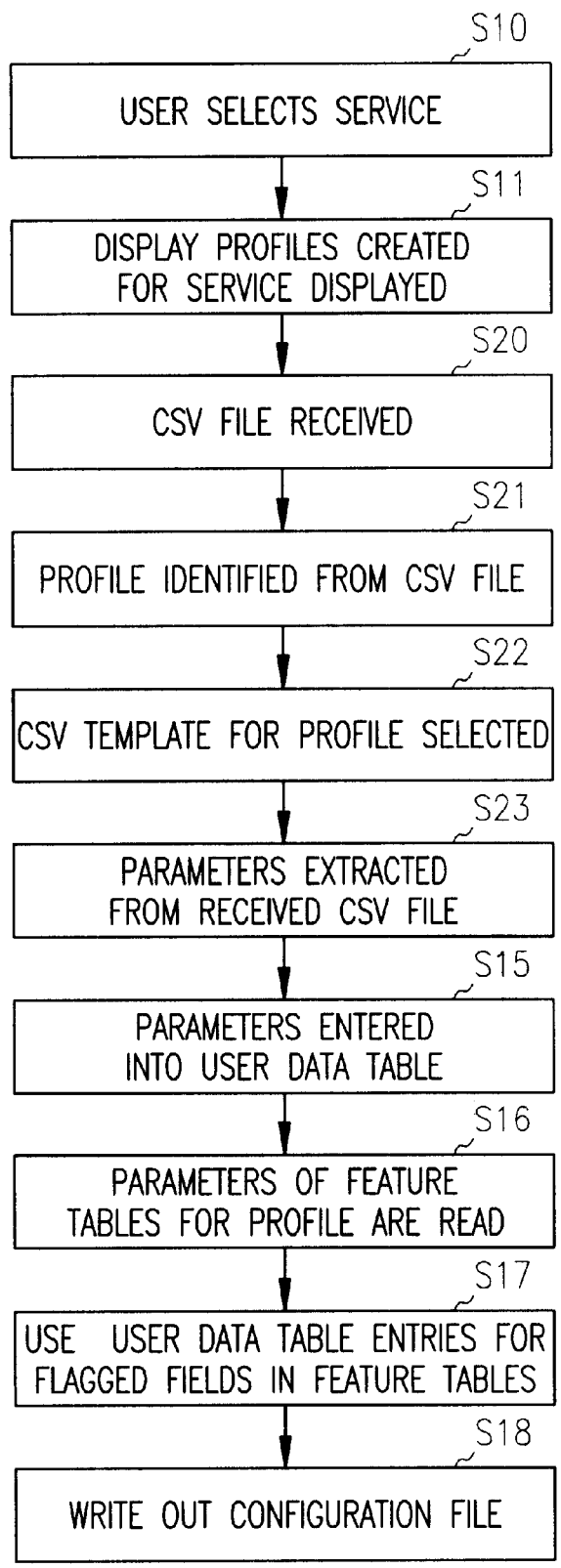

FIG. 1 is a functional diagram of an embodiment of the present invention,

FIG. 2 is a schematic diagram of a computer system for implementing the embodiment of the present invention, FIG. 3 is a schematic diagram of the data structure of the embodiment of the present invention, FIG. 4 is a flow diagram illustrating the steps carried out to generate a user input page and a CSV template, FIGS. 5a, 5b and 5c illustrates the user interface for selecting and inputting user-specific configuration parameters, FIG. 6 is a flow diagram illustrating the input of user-specific configuration parameters manually using the user input page, and FIG. 7 is a flow diagram illustrating the input of user-specific parameters from a CSV file using the CSV template.

DESCRIPTION OF BEST MODE

An embodiment of the present invention will now be described which relates to the generation of configuration data for a communications device such as a router, modem or ISDN terminal adapter to connect a computer system over a telecommunication network to an Internet Service Provider (ISP). Thus in this embodiment the configuration parameters are configuration parameters required for the device to access a service provided by the ISP.

FIG. 1 illustrates a functional overview of the embodiment of the present invention. A database 1 contains a number of sets of data hereinafter referred to as tables. Feature tables 1b are provided to contain the configuration parameters. The configuration parameters are not provided in one large table but are instead provided organised into a plurality of feature tables. Each feature table comprises a number of parameters which define a facet of the device and/or service. For example, a feature table can contain parameters for ISDN call details, the Internet Protocol (IP) interface, the domain name service (DNS) proxy server, and packet filtering, just to name a few. The grouping of the parameters into features is a matter of design choice. The grouping is intended to group parameters which relate to a particular feature of the device and/or service so that this can be used for organisational purposes to aid the understanding of the contents of the tables by an administrator wishing to make entries or amendments as will be described in more detail hereinafter.

Meta data tables 1a are also provided within the database 1. The meta data tables 1a comprise a meta feature table which comprises attributes for each feature table in the feature tables 1b. The meta data tables 1a also include a meta feature table. This table contains attributes on each parameter (or field) within the feature tables 1b. Further, the meta data tables 1b include a meta list table. These tables will be described in more detail hereinafter.

The database 1 also includes a user data table 1e which contains the user-specific parameters entered by a user. Associated with this is a user meta data table 1c which contains information to link to the meta data tables 1a. The database also includes comma separated value (CSV) templates 1d which can be used to convert data files received in CSV format from a remote system into an input into the user data table 1e.

The meta data tables 1a are created initially by a meta data table creator 2. The meta data tables 1a are used to generate an administrator interface 3. In this embodiment, the creation of the meta data tables 1a and the generation of the administrators interface 3 is carried out by the providers of the software. Thus, the administrator is provided with the meta data tables and program code that will implement the administrator interface 3 and an application 4 to generate the user meta data table, the user input pages and the CSV templates. In this embodiment the software provider generates the meta data tables taking into account service and/or device features and uses a program e.g. written in C++ to generate HTML (Hyper Text Markup Language) code for administrator web pages. The administrator interface is thus implemented by a web browser such as Netscape™ or Explorer™ with the administrator pages loaded.

A user configuration interface 5 allows a user to enter data into the user data table 1e. In this embodiment the application 4 operates HTML code for user input web pages from the meta data tables 1a. The user configuration interface is thus implemented by a web browser with a selected user input page loaded. An automatic configuration interface 6 receives parameters in the form a CSV file from a parameter input device 7. This is interpreted by reference to the CSV templates 1 in order to enter data into the user data table 1e.

In order to generate configuration data for a device to access a service, a configuration generator 8 is provided to access the user data table 1e and the feature tables 1b with reference to the user meta data table 1c, and the meta data tables 1a.

A more detailed description of the embodiment will now be described hereinafter.

FIG. 2 schematically illustrates the computer system for implementing the embodiment of the present invention. The present invention can be implemented on a multipurpose computer suitably programmed. Thus the system comprises an IBM™ compatible computer operating the Windows NT™ operating system. The computer system comprises a bus 10 communicating between the components within the computer. The computer is provided with a read only memory (ROM) 12 containing the computer Bios. Random access memory (RAM) 11 is provided as a working memory used by a processor 13. The processor 13 implements programs stored in a storage device 14 to implement a web browser 13a such as Netscape™ or Explorer™ The processor also loads a user interface generator program to implement a user input interface the generator 13b as will be described in more detail hereinafter. Also, a configuration generator program is loaded by the processor 13 from the storage device 14 to implement the configuration data generator 13c.

A database 15 is provided and contains the tables as described briefly with reference to FIG. 1. A display device 19 is provided which can be used both as the administrator interface 3 and the user configuration interface 5. A keyboard 18 is provided to input the configuration parameters and a pointing device 20 such as a mouse is provided to allow the selection of the parameters to be input. A removable memory device 21 is provided such as a floppy disk drive, CD ROM or tape device, enabling the computer software to be installed on the computer to implement the present invention.

A network interface 16 is provided to a network 17 such as the Internet. In this way the computer can comprise a computer provided at an ISPs premises to allow for the generation of configuration data via an ISP for the configuration of devices used by the ISPs customers.

In the computer system illustrated in FIG. 2, a web browser accesses web pages stored in the storage device 14 in order to provide the administrator interface 3. The HTML code for the administrator pages is stored in the storage device 14 and the sets of data comprising the tables 1a, 1b, 1c, 1d and 1e are stored in the database 15 when the software to implement the present invention is installed on the computer system of FIG. 2.

The administrator who operates the administrator interface 3 is deemed to be the person who has experience in configuring devices in great detail. Such a person is responsible for designing services and building prototype configurations for accessing services. When a new service is to be offered by a service provider, new sets of configuration parameters must be designed for accessing the service. This will be described in more detail hereinafter with reference to FIG. 4.

The data model used in the present invention will now be described in more detail with reference to FIG. 3.

A set of feature tables 50a, 50b, 50c and 50d are provided. Each table contains a group of parameters for each of a plurality of configurations identified by configuration IDs. As explained hereinafter above, each feature table comprises a group of parameters relating to a particular feature of the device and/or service.

A database interface 40 is provided to allow for the display of the contents of a row identified by configuration ID from each of the feature tables 50a, 50b, 50c and 50d in respective forms 30a, 30b, 30c and 30d in a web page. For a particular selected configuration ID, the parameters in each table will be displayed in each respective form. Thus, when the administrator wishes to review a set of configuration parameters, a particular configuration is selected thereby indexing the tables by the configuration ID to retrieve the parameters for display in respective regions or forms on the web page. When a new configuration is to be generated, a new configuration ID is assigned, and a new row in the feature tables 50a, 50b, 50c and 50d is generated to allow parameters which are entered in the forms 30a, 30b, 30c and 30d to be input in fields in the tables 50a, 50b, 50c and 50d.

A meta feature table 60 is provided and contains table attributes for each of the tables. The table attributes include the table name which will give each of the respective forms a title to identify the features to which the parameters relate. The table attributes also include an identification of the order in which the tables are to appear.

The meta feature table 60 also includes a list of hardware models for each feature for which the feature is applicable. Some hardware and software releases which control devices will not support certain features. Thus the meta feature table 60 contains all the information necessary to ensure that the configuration parameters generated for a service are appropriate for configuring certain devices having certain software capabilities.

A meta field table 70 is also provided which contains attributes on each of the parameters in the feature tables i.e. attributes on each field in the feature tables. The attributes include the name of the field (parameter). This is used for labelling the display i.e. acting as a prompt in the forms 30a, 30b, 30c and 30d. The field attributes can also include maximum and minimum values to be used to check for the validity of the input data to ensure that it lies within a predefined range. Further, the field attributes can include information on the type of parameter e.g. numeric or text data. Thus, the field attributes for the meta field table 70 can be used for the control of the display of individual input prompts for parameters and can be used to check the validity of the input data.

A third type of meta table is the meta list table 80. This table is used to hold attributes for configurations which have more than one instance. For example, as can be seen in the feature table 50d, a column is labelled "INDEX". Thus in addition to identifying a set of parameters by the configuration ID, for a particular configuration ID which has more than one instance, an index can be used to hold more than one set of parameters for that configuration ID. This causes a problem for the display of the data in the form 30d. This is overcome by the meta list table 80 which holds attributes identifying the way in which the parameters are to be listed in the farm 30d.

When the software is initially installed on the computer system, only the meta feature table 60, the meta field table 70 and the meta list table 80 are populated with data. The feature tables 50a, 50b, 50c and 50d are empty since no configuration parameters have been input. The administrator interface, comprises a web page generated in accordance with the meta tables 60, 70 and 80 displays the forms 30a, 30b, 30c and 30d as one or more web pages. Thus the administrator is able to select a configuration i.e. select a configuration ID, and enter configuration parameters into the various fields. In this way the administrator is able to generate a set of configuration parameters for a device to access a service. This is usually done in order to provide configuration parameters for a new service. It is thus necessary for the administrator to build a prototype configuration in order to test the service. It is then necessary for the administrator to provide the tested configuration data to the users of the service. The method for achieving this will now be described in more detail with reference to FIG. 4.

In step S1 the administrator builds a prototype configuration which comprises a complete set of parameters for a device to access a service. The administrator then identifies which feature parameters are generic to a group of users and which need to be input by a user. For those parameters which need to be input by a user the administrator can enter a question mark (?) in the input field. In step S3 the parameters are entered in a row in the feature tables with a unique configuration ID and the entries in the row in the features tables which are for user-specific input are flagged by entering the question mark input by the administrator. The parameters are entered into the feature tables as characters even though many of them are of numeric values. Thus the interface 40 ensures that any entries made in the forms 30a, 30b, 30c and 30d are transferred to the feature tables 50a, 50b, 50c and 50d in text form. Thus it is simply necessary to transfer the input on the web page (including the question marks) into the correct fields in a row in the feature tables.

In step S4 the feature tables are searched in order to locate the flags (?). Because all of the entries in the feature tables are characters, the searching technique simply comprises a character search for the question mark character. When a question mark is found in a field in the features tables, the attributes of the parameter are looked up in the meta field table 70. The attributes for each of the parameters required in order to complete a row in each of the feature tables 50a, 50b, 50c and 50d are used to generate the HTML code for a user input page in step S6. Also, in step S7, the comma separated value (CSV) template is created to allow the user-specific configuration parameters to be input from a separate application such as from other databases or other applications already in use by the ISP. Further, in step S8 entries in the user meta table 90 are generated. A row is generated for each user-specific parameter which is required to be input.

The user meta data table 90, as illustrated in FIG. 3, is used to link the user-specific configuration parameters with the fields of the feature tables 50a, 50b, 50c and 50d. Thus the user meta data table 90 includes the meta form name and meta field name for each input user-specific parameter.

Within the database there is also included an ID link table 150 which includes information on what type of configuration is identified by the configuration ID. For example, when an administrator generates a configuration, they may generate a complete configuration whereby all of the fields of a row of the feature tables 50a, 50b, 50c and 50d include parameters. This is usually carried out during the prototyping phase. Such a configuration is thus complete and defines parameters for a stand alone device. If on the other hand an administrator enters questions marks in some fields, the configuration is incomplete and is thus termed a profile which can be used to generate one or a number of complete configurations. Thus in the ID link table 150 configuration IDs which are incomplete are identified as comprising profiles and configuration IDs for complete configuration are identified as stand alone devices. When the administrator generates a profile there are question marks in the feature table fields and thus there is a need to generate a user input page or CSV template.

As will be described in more detail hereinafter, when a user of the user interface enters user-specific configuration parameters to complete a set of configuration data, the entered data is assigned a configuration ID and is stored in the user data table 140 illustrated in FIG. 3. The configuration ID assigned to the input is unique and of course does not on its own define a complete configuration. The configuration ID is thus entered into the ID link table 150 to indicate that it is a configuration instance for profile and the configuration ID of the profile is identified. In this way the row in the feature tables 50a, 50b, 50c and 50d to which the input user-specific configuration parameters relate is identified.

Thus, for example, if the feature tables contained rows for configuration IDs 1 and 2 which are complete i.e. stand alone devices and rows for configuration IDs 3 and 4 which have ? and are thus incomplete i.e. profiles, and a user has selected the first profile (i.e. configuration ID 3) and has entered user-specific parameters into the user data table 140, when the user-specific parameters are entered they are given a configuration ID 5 i.e. the configuration ID 5 for a configuration instance. The ID link table will thus be:

| CONFIG ID | TYPE OF CONFIG | SUBTYPE OF CONFIG | PROFILE ID |
|---|---|---|---|
| 1 | Device | Stand Alone | — |
| 2 | Device | Stand Alone | — |
| 3 | Profile | — | — |
| 4 | Profile | — | — |
| 5 | Device | Profiled | 3 |

As can be seen, configuration ID 5 for the device instance is linked to configuration ID 3 for the profile. Thus the complete set of parameters for a configuration are identified by this linking.

The operation of the user interface will now be described in more detail with reference to FIGS. 5 to 7.

FIGS. 5a, 5b and 5c illustrate the displayed user interface. In FIG. 5a the user is offered one of two types of service. Either a basic Internet service or the corporate Internet service. When a user selects the corporate Internet service, in FIG. 5b the user interface then illustrates three profiles which are available basic, gold or platinum. When the user selects the gold profile, in FIG. 5c the user input page is displayed allowing the user to enter the user-specific configuration parameters for that profile to thereby generate a complete set of configuration parameters to access the service at a particular level. This process will now be described in more detail with reference to the flow diagram of FIG. 6.

In step S10 the user selects the service. In step S11, the names of the profiles created for the selected service are displayed. In step S12 the user selects the desired profile in step S13 the user input page for the selected profile is displayed. The user then enters the user-specific configuration parameters in step S14 and in step S15 the parameters are entered into the user data table. This can be seen with reference to FIG. 3 wherein the user input page 100 is displayed and the user enters the parameters A, B, C, D and E. These are then transferred by the interface 120 into the user data tables 140.

In step 516 the parameters of the feature tables for the profile are read. These are identified using the ID link table 150 by matching the configuration ID for the configuration instance to the configuration ID of the profile. In step S17 the user data table entries for the flagged fields in the feature tables are used and in step S18 the configuration file is written out.

FIG. 7 is a flow diagram of the steps carried out when instead of manually inputting data using the user input page 100, a CSV file 110 (illustrated in FIG. 3) is input from an external application. The flow diagram of FIG. 7 differs from the flow diagram of FIG. 6 in that steps S12, S13 and S14 are replaced with steps S20, S21, S22 and S23. In step S20 the CSV file is received and in step S21 the profile is identified from the contents of the CSV file. Step S22 the CSV template for the identified profile is selected and in step S23 the parameters are extracted from the received CSV file using the interface 130 shown in FIG. 3. The parameters are then entered into the user data table in step S15.

Although in the flow diagrams of FIGS. 6 and 7, a complete configuration file is written out in step S18, the process need only go as far as step S15 wherein the parameters are entered into the user data table. This is sufficient for the database to contain a complete set of configuration parameters for the device instance. In this embodiment the configuration parameters for the configuration of a profiled device instance are contained partially in the user data table 140 and partially in the featured tables 50a, 50b, 50c and 50d and the linkage is provided by the user meta data table 90 and the ID link table 150.

This division of the generic configuration data of a profile and the user-specific configuration data provides for an efficient storage technique. By only storing the configuration parameters for the profile once, and storing only the unique configuration parameters for each user, separately on the user data table 140, the storage requirement for storing the configuration parameters is substantially reduced. Further, because there is only one set of common (generic) configuration parameters, when an administrator wishes to update or modify any of those configuration parameters because for example something about the system has changed (e.g. an access telephone number has been changed), the administrator need only change the profile once and this can be used for the automatic generation of updated configuration files for a device instances.

In the embodiment described hereinabove with reference to FIGS. 5 to 7, when the user or the CSV file enters the user-specific parameters, they are entered in the user data table 140 and assigned a unique, configuration ID. In another embodiment, as an alternative to, or as an option available to a user, instead of storing the user-specific parameters in the user data table 140, they can be stored under the unique ID in feature tables 50a, 50b, 50c and 50d. This can be achieved by copying the parameters for the profile on which a configuration is based into a new row under the new unique configuration In and adding in the input user-specific configuration parameters in place of the question marks. In this way, a stand alone device can be defined by a user in the feature tables 50a, 50b, 50c and 50d. The ID link table 150 will thus show that the configuration ID does not refer to a profile and comprises a stand alone device configuration. A profile could thus be created which stipulates that devices created from the profile are stand alone devices and not profiled devices.

The data structure of the present invention is arranged as a relational database structure. Thus when new hardware and/or software is made available, the meta feature table 60, the meta field table 70 and the meta list table 80 can be updated by providing the Internet Service Provider (ISP) with a later release of software. The modifications to the meta tables will simply include the addition of additional parameters and/or features made available by the new hardware of software. None of the attributes or features will be deleted from the meta tables so as to support all the previous devices and the devices running previous software versions.

When the administrator builds a prototype service, within that prototype the hardware and the software to be used will be taken into account.

Although in this embodiment the software is illustrated as being implemented on a computer system, for intelligent communication devices such as routers, modems, or ISDN terminal adapters, the software could be implemented in the device.

Because the user interface is implemented in a web environment based on the meta data in the meta field table 70, the form in which the prompts appear on the user input page is the same as they appear on the administrators interfaces the same meta data is used.

Although in the embodiment described hereinabove, the template described is the comma separated value (CSV) template, other formats can be used.

Although the embodiment of the present invention has been described as being implemented using a web browser, the present invention can be implemented using other programming languages such as C++. Indeed, the user input interface generator is implemented as C++ code in order to search the feature tables for flagged fields, to identify the associated meta data, and the user meta data to generate HTML code which will cause a web browser to display the user input page. Similarly in order to generate the software to implement the present invention, a C++ program is used by the software vendor to generate the. HTML code for the administrator web pages based on the meta data tables.

This embodiment of the present invention the meta data tables contain information about how to interpret and operate each of the feature tables and fields. By providing the meta data separate from the data, the way in which the parameters are operated upon and displayed can be modified easily simply by modifying the meta data tables.

The present invention can be implemented as a computer program and thus the present invention can be embodied as a storage media carrying instructions for controlling a computer to cause a computer to be configured as the apparatus and to implement the method. Further, because the computer program can be made available over the Internet by the transmission of an encoded signal, the present invention can be embodied as an electrical signal carrying the computer program for controlling the computer to be configured as the apparatus and to carry out the method.

Within the present invention has been described hereinabove with reference to specific embodiments, it will be apparent to a skilled person in the art that modifications can be made to the embodiments within the spirit and scope of the present invention.

I claim:

1. Apparatus for generating a set of configuration data for a device, the apparatus comprising:

an administrator interface allowing an administrator to enter configuration parameters for a generalised configuration and to define user specific configuration parameters necessary for the generation of a complete set of configuration data;

a storage device for storing the entered configuration parameters and for identifying the user specific configuration parameters;

a user interface allowing a user to enter the user specific configuration parameters, and a configuration generator for generating a set of configuration data using said stored configuration parameters and said user specific configuration parameters;

wherein said storage device stores a set of feature meta data comprising a plurality of attributes associated with each one of a plurality of groups of said configuration parameters, each group of said configuration parameters defining a configuration feature, said administrator interface including a display and being configured in accordance with said set of feature meta data to display a series of forms for the inputting of the administrator entered configuration parameters, a form corresponding to a said group of configuration parameters, said storage device further storing the administrator entered configuration parameters organised into said groups.

2. Apparatus for generating a set of configuration data for a device, the apparatus comprising:

an administrator interface allowing an administrator to enter configuration parameters for a generalised configuration and to define user specific configuration parameters necessary for the generation of a complete set of configuration data;

a storage device for storing the entered configuration parameters and for identifying the user specific configuration parameters;

a user interface allowing a user to enter the user specific configuration parameters;

a configuration generator for generating a set of configuration data using said stored configuration parameters and said user specific configuration parameters;

wherein said storage device stores a set of parameter meta data comprising a plurality of attributes associated with each configuration parameter, said administrator interface includes a display and is configured in accordance with said set of parameter meta data to at least one of determined display parameters for the input of said configuration parameters and operate on the entered configuration parameters, said user interface being configured to operate on user entered configuration parameters in accordance with said set of parameter meta data.

3. Apparatus according to claim 2, wherein said user interface includes a display and is configured to determine display parameters for the input of said configuration parameters in accordance with said set of parameter meta data.

4. Apparatus for generating configuration data for a device to access a service the apparatus comprising:

a database containing:

i. a set of feature meta data comprising attributes for a plurality of features, wherein a feature comprises a user definable characteristic of at least one of the device and service and being defined by a group of configuration parameters; and ii. a plurality of sets of said configuration parameters, each set corresponding to a feature; and interface means including a display and configured in dependence upon said set of feature meta data to display prompts for the input of said configuration parameters to said database, said prompts being grouped for each feature in accordance with said sets of configuration parameters in said database.

5. Apparatus according to claim 4, wherein said database includes a set of parameter meta data comprising attributes for each said configuration parameter, and said interface means is configured in dependence upon said set of parameter meta data to cause the display of the respective prompt for a configuration parameter to be in accordance with the respective parameter meta data.

6. A method of generating a set or configuration data for a device, the method comprising:

receiving configuration parameters for a generalised configuration and identified user specific configuration parameters necessary for the generation of a complete set of configuration data from an administrator interface;

storing the entered configuration parameters and identifying the users specific configuration parameters required to complete the set of configuration data in a storage means;

receiving user specific configuration parameters from a user interface;

generating a set of configuration data using said stored configuration parameters and said user specific configuration parameters, wherein a set of feature meta data is stored comprising a plurality of attributes associated with each one of a plurality of groups of said configuration parameters, each group of said configuration parameters defining a configuration feature, said administrator interface displays a series of forms in accordance with said set of feature meta data for the inputting of the administrator entered configuration parameters, a form corresponding to a said group of configuration parameters, and the administrator entered configuration parameters are stored and organised into said groups.

7. A method of generating a set of configuration data for a device, the method comprising:

receiving configuration parameters for a generalised configuration and identified user specific configuration parameters necessary for the generation of a complete set of configuration data from an administrator interface;

storing the entered configuration parameters and identifying the users specific configuration parameters required to complete the set of configuration data in a storage means;

receiving user specific configuration parameters from a user interface;

generating a set of configuration data using said stored configuration parameters and said user specific configuration parameters;

wherein a set of parameters meta data is stored comprising a plurality of attributes associated with each configuration parameter, said administrator interface is configured in accordance with said set of parameter meta data to at least one of determined display parameters for the input of said configuration parameters and operate on the entered configuration parameters, said user interface being configured to operate on the user entered configuration parameters in accordance with said set of parameters meta data.

8. A method according to claim 7, wherein said user interface is configured to determine display parameters for the input of said configuration parameters in accordance with said set of parameter meta data.

9. A method of generating configuration data for a device to access a service, the method comprising:

providing a database containing;
  i. a set of feature meta data comprising attributes for a plurality of features, where a feature comprises a user definable characteristics of at least one of the device and service and being defined by a group of configuration parameters, and
  ii. a plurality of sets of said configuration parameters, each set corresponding to a feature; and generating a display interface configured in dependence upon said set of feature meta data thereby displaying prompts for the input of said configuration parameters to said database, said prompts being grouped for each feature in accordance with said sets of configuration parameters in said database.

10. A method according to claim 9, including providing a set of parameter meta data comprising attributes for each said configuration parameters in said database, and generating said interface configured in dependence upon said set of parameter meta data to cause the display of the respective prompt for a configuration parameter to be in accordance with the respective parameter meta data.

11. A storage medium storing computer implementable instructions for controlling a computer to carry out the method of claims 6, 7, 8, 9, or 10.

12. An electrical signal carrying a computer program to control a computer to carry out the method of claims 6, 7, 8, 9 or 10.

* * * * *